United States Patent [19]

Brotz

[11] Patent Number: 4,982,915
[45] Date of Patent: Jan. 8, 1991

[54] STRUCTURE AND METHOD OF PRODUCING FOAMS HAVING HYDROGEN-FILLED CELLS FOR USE IN AIRSHIP/BALLOON ENVELOPES

[76] Inventor: Gregory R. Brotz, P.O. Box 1322, Sheboygan, Wis. 53081

[21] Appl. No.: 335,742

[22] Filed: Apr. 10, 1989

[51] Int. Cl.$^5$ ............................................. B64B 1/24
[52] U.S. Cl. ...................................... 244/98; 244/30; 244/31; 244/129.2; 244/5; 169/62
[58] Field of Search ...................... 244/126, 96, 97, 98, 244/129.2, 30, 31, 5; 169/62, 54

[56] References Cited

U.S. PATENT DOCUMENTS

| 2,362,966 | 11/1944 | Bertsch | 244/98 |
| 3,443,776 | 5/1969 | Moore | 244/5 |
| 3,450,374 | 6/1969 | Moore | 244/5 |
| 4,646,848 | 3/1987 | Bruensicke | 169/62 |

Primary Examiner—Charles T. Jordan
Assistant Examiner—Rochelle Lieberman
Attorney, Agent, or Firm—William Nitkin

[57] ABSTRACT

A fire-resistant foam having hydrogen-filled cells for use in airship/balloon envelopes.

3 Claims, 1 Drawing Sheet

STRUCTURE AND METHOD OF PRODUCING FOAMS HAVING HYDROGEN-FILLED CELLS FOR USE IN AIRSHIP/BALLOON ENVELOPES

BACKGROUND OF THE INVENTION

1. Field of the Invention

The structure and method of this invention reside in the area of airship/balloon envelopes such as used in blimps, dirigibles and other types of lighter-than-air structures which lift objects, and more particularly relate to a system of maintaining hydrogen gas within the cells of a foam in such airship/balloon envelopes.

2. Description of the Prior Art

Airships such as blimps and dirigibles have long been in use and hydrogen gas has been utilized to cause the craft to be lighter than air. Problems, though, arose with the use of hydrogen gas since it is highly inflammable. To replace hydrogen, helium has been used, but helium is expensive while hydrogen can be made inexpensively by the simple electrolysis of water. Fire retardant foams using polyglycols have been used in the past to smother fires.

SUMMARY OF THE INVENTION

It is an object of this invention to create a system which will allow the safe utilization of hydrogen in an airship or balloon envelope structure and which will prevent the possibility of ignition of the hydrogen to avoid explosions from the use of such a highly inflammable gas in the airship or balloon's envelope.

It is a further object of this invention to provide an envelope with hydrogen gas entrapped within the cells of a foam within the envelope which foam isolates the hydrogen in the foam's small, fire-resistant compartments and prevents any mass ignition of the gas in case a spark should come near such envelope.

It is yet a further object of this invention to provide a new and novel method for utilizing hydrogen gas in airship and balloon envelopes by the provision of a foam beng delivered continuously into the envelope during the use of the system of this invention with the hydrogen being entrapped within the cell walls of the foam.

The basic structure of this invention utilizes an envelope which can be made of rubber or other equivalent material. To prevent this occurrence, mylar has been used to contain hydrogen. Rubber envelopes cannot be successfully used to contain hydrogen since the hydrogen would quickly leak through the surface of the rubber envelope because of its high porous nature. The use of the system of this invention entraps hydrogen within the cells of a foam within an envelope and thereby allows one to use envelopes of a more porous nature such as those made of rubber thereby reducing the costs of the envelope's structure.

In the process of this invention a mixing device such as a high-speed blender of ingredients has an inlet connected to a holding tank which supplies hydrogen under pressure to the blender. The envelope is positioned above the blender and is open to the top of the blender. Within the blender is placed an organic liquid being a non-combustible material such as mineral oil or equivalent which has a density that is lower than that of water. A surfactant such as used in detergents or equivalent is added in an amount sufficient to cause the mineral oil to foam when the blender's blades rotate at high speed. Also included in the mixture is a fire retardant which is a substance that has a very high flash point. A foam stabilizer could also be used to reduce the amount of deterioration of the foam. Self-generating foams could also be utilized. The hydrogen gas can first be used to displace air from the blender. After air has been thus displaced, the blender is turned on, causing the ingredients, because of the surfactant, to foam to a very high density with the hydrogen gas entering the blender chamber and being entrapped within the cells of the foam mass. Hydrogen gas becomes entrapped within the cells of the dense foam being created because of the high spced turning of the blades of the blender. The foam rises above the top of the blender and eventually fills the entire envelope, displacing any air therein. The blender can be left operating during the flotation of the airship/balloon and continuously produces foam having hydrogen-filled cells to replace any cells which may have burst over time. The liquids from any such broken cells would tend to drain along the edge surfaces of the envelope or through the foam mass to the bottom of the envelope. A drain pipe can be provided to direct the fluids back into the blender so that they can be refoamed. The continuous operation of the system of this inventIon fills the envelope with foam with each cell containing hydrogen from the hydrogen tank. In this way the hydrogen is entrapped within a cell containing a fire retardant in its wall and if any portion of the balloon should come in contact with a spark or flame, the flame would not spread through the foam-filled envelope. Any cells that might be broken by the lowering of the viscosity from the heat of a flame or spark would flow back into the fluid mass with any escaped hydrogen eventually forming a small amount of water as it mixes with the air which mixture also will be drained from the envelope. In this way only a very limited amount of the hydrogen would be available for ignition by a flame should any spark or flame come in contact with the envelope or the foam mass. The greatly reduced inflammability of the hydrogen gas held in the cells of the foam makes it practical to use cost-effective hydrogen in airship/balloon envelopes without the fear of fire or explosions.

DESCRIPTION OF THE PREFERRED EMBODIMENT(S)

Figure 1:
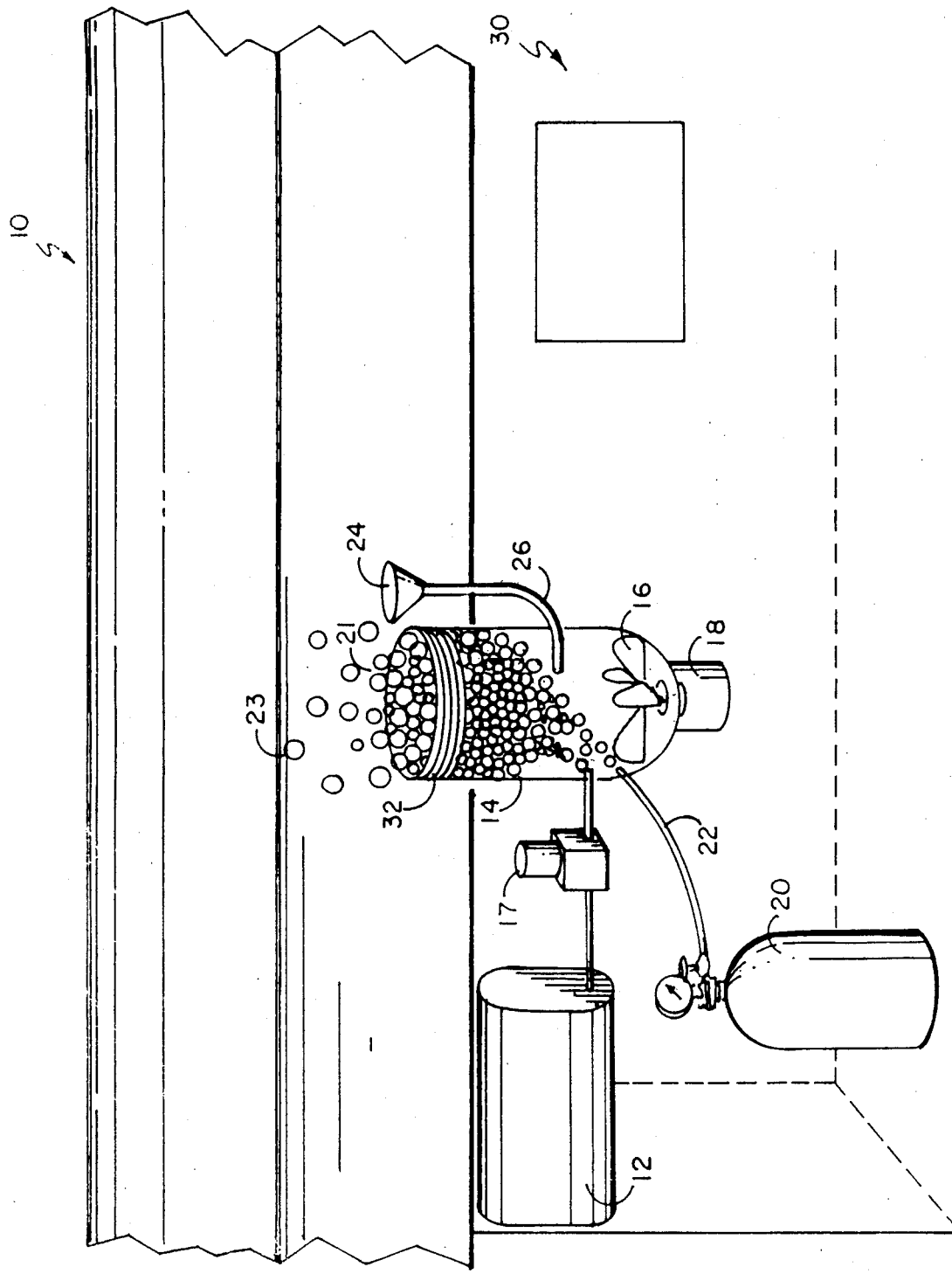
FIG. 1 illustrates the basic structure of the airship/baloon envelope of this invention.

FIG. 1 illustrates the basic structure of this invention with envelope 10 shown above gondola 30 with blender chamber 14 located therebelow having the foam ingredients from tank 12 pumped by pump 17 thereto. Blender chamber 14 having blades 16 therein is operated by motor 18 at high speed with hydrogen tank 20 directing hydrogen into the blender through tube 22 so that when the blades 16 of blender chamber 14 are rotated at high spced within the mixture of the organic liquid, surfactant and fire retardant, the resulting foam 21 contains hydrogen within its cells. The overflow 23 of foam 21 fills envelope 10. The fluid from any foam cells that may break will drain to the bottom of the envelope and out drainage aperture 24 through drainage pipe 26 back into the blender chamber for refoaming. It is expected that blender chamber 14 will operate continuously while the envelope is in active use to keep hydrogen entrapped within the cells within the constantly provided foam cells to eliminate the possibility of explosion.

In some embodiments the top of the blender chamber can be interconnected to the envelope by a tube with heating coils 32 around the tube to heat the foam and expand the hydrogen in the cells thereby reducing the amount of foaming mixture needed.

The foam of this invention can be used in any type of airship/balloon envelope including lens-shaped crafts where the envelope is retained by a net structure and also in the so-called super pressure balloons. Even multiple envelopes can be connected by tubes to the foam generator of this invention. In some embodiments hydrogen can be mixed with other gases such as helium to impart it with characteristics that may be desirable in certain situations.

Although the present invention has been described with reference to particular embodiments, it will be apparent to those skilled in the art that variations and modifications can be substituted therefor without departing from the principles and spirit of the invention.

I claim:

1. An airship/ balloon envelope structure comprising:
   a mixing chamber having an open top interconnected to said airship/balloon envelope;
   a mixture of an organic liquid, a surfactant and a fire retardant;
   means to enter said mixture into said mixing chamber;
   hydrogen gas;
   means to enter said hydrogen gas into said mixing chamber; and
   a blender positioned at the base of said mixing chamber adapted to foam said mixture with said hydrogen gas and trap said hydrogen gas within the cells formed in the foam with said overflowing foam from the top of said mixing chamber filling said airship/balloon envelope with said foam mixture.

2. The structure of claim 1 further including means to drain excess fluid resulting from broken foam cells from said airship/balloon envelope and returning said fluid to said blender for refoaming.

3. A method of utilizing hydrogen gas within an airship/balloon envelope structure, comprising the steps of:
   mixing said hydrogen gas with a mixture of an organic liquid, a surfactant and a fire retardant;
   blending said hydrogen gas at high speed with said mixture to form a foam;
   trapping siad hydrogen gas within the cells of said foam; and filling said airship/balloon envelope with said foam.

* * * * *